March 21, 1944.  W. S. BERRY  2,344,848
STEERING GEAR
Filed April 11, 1941
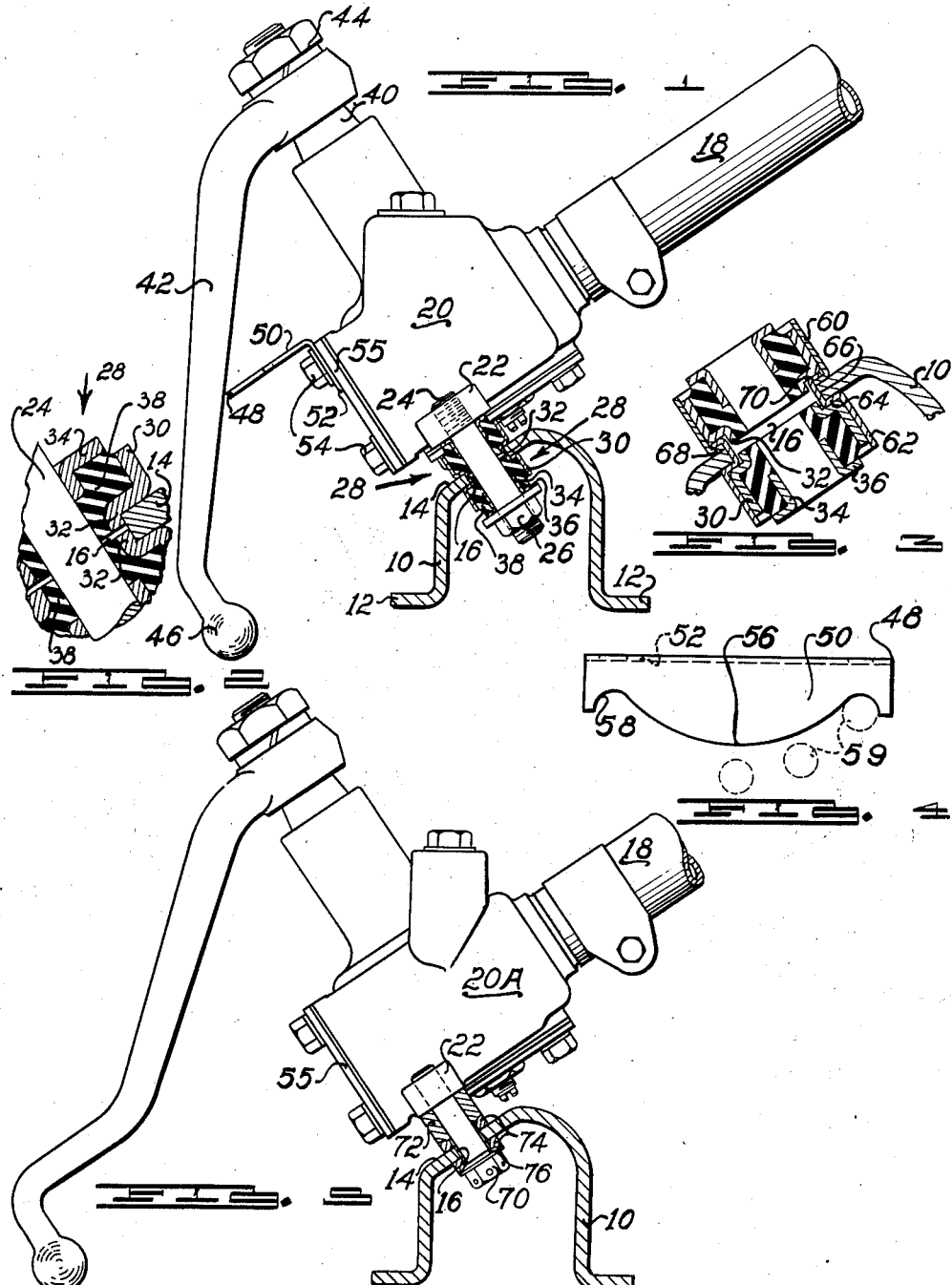
INVENTOR.
WALLACE S. BERRY
BY Carl J. Barbee
his ATTORNEY.

Patented Mar. 21, 1944

2,344,848

UNITED STATES PATENT OFFICE 2,344,848

STEERING GEAR

Wallace S. Berry, Kenosha, Wis., assignor to Nash-Kelvinator Corporation, Kenosha, Wis., a corporation of Maryland Application April 11, 1941, Serial No. 387,997

10 Claims. (Cl. 280—87)

This invention relates to steering gears and has particular reference to means for mounting the steering gear of an automotive vehicle upon the frame of the vehicle.

It is an object of this invention to provide means for mounting a steering gear which will permit the steering column and gear to assume various angular positions with respect to the frame of the automobile to compensate for inaccuracies in the manufacture of the frame and body of the automobile.

It is another object of this invention to provide means for mounting a steering gear which will prevent the transmission of vibration and shock from the frame of the automobile to the steering gear and steering column.

It is another object of this invention to provide means for limiting the amplitude of the oscillations of the Pittman arm in a steering gear.

It is another object of this invention to provide means for locating flexible bushings for mounting a steering gear on a portion of the frame of an automobile.

Other objects and advantages of this invention will be apparent from a consideration of the following description and claims and the attached drawing, of which there is one sheet, and in which—

Figure 1 represents a side elevational view of a steering gear mounted upon a cross member of an automobile, the cross member and mounting means being shown in cross section;

Figure 2 represents an enlarged fragmentary sectional view showing the mounting bushings of Figure 1 in greater detail;

Figure 3 represents an enlarged sectional view showing a modified type of mounting bushing similar to that shown in Figure 1;

Figure 4 represents a top view of the Pittman arm stop illustrated in Figure 1; and Figure 5 represents a view similar to Figure 1 showing a further modified method of mounting a steering gear on a rigid cross member.

This invention provides means for supporting a steering gear on a member extending transversely of an automobile as distinguished from the usual practice of supporting the gear on a longitudinally extending side rail or sill member of the frame. By way of example, there is illustrated in the drawing a rigid cross member 10 which may form a part of a chassis frame or may be secured to the side sill members of a unitary type of automobile body construction. The cross member is generally channel shaped in cross section and opens downwardly with horizontal flanges 12 extending from the lower edges thereof. The upper or webbed portion of the cross member 10 is shaped as by stamping to form a sloping wall 14 which slopes downwardly and forwardly of the automobile and defines apertures as at 16. The sloping wall 14 lies in a plane which is approximately parallel to the line in which the central axis of the steering column 18 is to lie when installed in the automobile.

The steering column 18 is attached to a suitable case 20 within which the steering gear is positioned and which may be of any suitable design. The case 20 is provided with a lug 22 on each side thereof, which lugs are drilled and tapped to receive the stud bolts 24. The stud bolts 24 extend downwardly through the apertures 16 in the cross member 10 and the lower ends of the stud bolts are threaded to receive the nuts and lock washers 26. Positioned around each stud bolt 24 on each side of the cross member 10 is a bushing generally indicated at 28. Each bushing consists of an outer, cylindrical member 30 having a flanged shoulder 32 defining an opening at one end thereof. Positioned in nested relationship within the cylindrical members 30 are the cylindrical ferrules 34 which are flanged outwardly as at 36. The space between the outer cylindrical members 30 and inner ferrules 34 is filled with an elastic material 38 such as rubber which is bonded to the inner surface of the outer cylindrical members and the outer surface of the ferrules 36 as by vulcanization.

The shoulders of the cylindrical members 30 rest against the top and bottom of the inclined wall 14 with the flanges 32 projecting into the apertures 16. The stud bolts 24 extend through the ferrules 34 and the rubber material is compressed by tightening the nut and washer 26.

The gear case 20 and steering column 18 are thus mounted on the cross member 10 without metallic contact between the cross member and the case and with sufficient flexibility in the connection to permit the steering column 18 to change its angular position slightly with respect to the cross member 10. The stud bolts 24 are also separated from the cross member 10 by the rubber in the bushings 28.

Projecting from the top of the case 20 is a shaft 40 on which is secured the Pittman arm 42. A nut and lock washer 44 are used to secure the Pittman arm in place. Rotation of the shaft 40 by the gears within the case 20 causes the Pittman arm to oscillate in an arc so that the ball end 46 will swing transversely of the automobile to impart steering motion to the steering linkage (not shown). Bolted to the lower end of the case 20 is an angle plate 48 having an upper flange 50 and a base flange 52 which is secured to the bottom of the case 20 by the cap screws 54 which secure the cover 55 of the case 20 in place.

The upper flange 50 of the bracket 48 is so shaped as to have a central arc 56 (see Figure 4) at each end of which is a pocket or notch 58. The notches 58 are arranged to be located at the end of the desired travel of the Pittman arm 42. The arc 56 is of such a radius that the arm 42 clears the plate 50 in all intermediate positions of the arm. Note the various positions of the Pittman arm indicated by the dotted circles 59 in Figure 3. The notches 58 function to prevent the Pittman arm from turning the wheels of the vehicle at too great an angle.

In the construction shown in Figure 3, which is the preferred form of the invention, guide sleeves 60 and 62 have been added to the construction shown in Figure 1. The lower guide sleeve 62 is provided with a shoulder 64 which seats against the under surface of the cross member 10 and an upwardly extending cylindrical flange 66 which projects through the aperture 16 in the cross member 10. The upper guide sleeve 60 is provided with an inwardly turned flange 68 at the bottom thereof which seats against the upper surface of the cross member 10 and defines an aperture through which the cylindrical flange 66 projects. The upper edge of the cylindrical flange 66 is rolled outwardly as at 70 to overlie the inwardly turned flange 68 on the upper guide sleeve 60. The guide sleeves 60 and 62 are thus interlocked and held in place on the cross member 10 and insure that the flanges 32 of the cylindrical members 30 will be centered in the aperture 16 and that the cylindrical members will bear properly against the surface of the cross member 10. The sleeves 60 and 62 have been found desirable due to the fact that the thickness of the material in the channel member 10 limits the length of the flanges 32 on the bushings 28 to such a small figure that the flanges alone are insufficient to properly center the bushings with respect to the apertures 16. The use of the sleeves permits the speed of assembly of the steering gear and cross member to be increased without danger of mis-alignment of the parts.

In the modified form of the invention illustrated in Figure 5, the cross member 10 is identical with that shown in Figure 1 having the same sloping wall 14 defining apertures 16. The steering gear case 20A is illustrated as being slightly different from that shown in Figure 1 but this is not material to the invention. The case 20A is provided with lugs 22 defining tapped apertures the same as the lugs 22 shown in Figure 1.

Extending through the apertures 16 in the cross member 10 and threaded into the tapped holes in the lugs 22 are cap screws 70. Positioned around the cap screws 70 and just underneath the lugs 22 in the steering gear case are spacing washers 72 having a convex, semi-spherical surface on the underside thereof. Positioned on each side of the sloping wall 14 is a washer 74 having a concave, semi-spherical surface facing away from the sloping wall 14. The concave surface of the upper washer 74 engages and mates with the convex surface on the underside of the spacing washer 72 while the concave, semi-spherical surface of the lower washer 74 engages and mates with a convex, semi-spherical surface 76 formed on the underside of the head of the cap screw 70. Attention is called to the fact that the diameter of the aperture 16 in the sloping wall 14 and the diameter of the apertures in the washers 74 are greater than the diameter of the shank of the cap screw 70 so that there is ample clearance between the shank of the cap screw and the sloping wall 14 and washer 74.

From the above description it should be apparent that the convex, semi-spherical surfaces on the spacing washer 72 and the head of the cap screw 70 form ball surfaces which may swivel in the concave, semi-spherical surfaces of the washers 74 to permit the gear case 20A to change its angular position relative to the cross member 10. Thus the steering column 18 may be raised or lowered to compensate for any inaccuracies which may occur in the manufacture of the automobile body. While the gear case 20A is permitted to swivel slightly, it is firmly supported upon the cross member 10.

I have thus provided a connection between the steering gear of an automobile and the automobile body which permits the steering gear and steering column to be shifted slightly, which connection may be simply and inexpensively made. I have also provided means for insulating the steering gear from the automobile body and for limiting the amplitude of oscillation of the steering gear. While the steering gear has been disclosed as being attached to a rigid cross member, it should be readily apparent that similar mounting means could be applied to other portions of an automobile body, such as a bracket attached to the frame or side sill, without departing from the spirit of the invention.

While I have described my invention in some detail, I intend this description to be an example only and not as a limitation of my invention, to which I make the following claims:

1. A connection between a steering gear case and a portion of an automobile body comprising a bolt extending between said body and said case, bushings positioned around said bolt and on each side of said body portion, said bushings having inner and outer cylindrical members spaced from each other by deformable material, and means locating said bushings relative to said body portion.

2. A connection between a steering gear case and a portion of an automobile body comprising bolts extending through said body portion and secured to said case, bushings positioned around said bolt on each side of said body portion, said bushings having outer cylindrical portions and inner portions spaced by deformable material, and flanges formed on said outer cylindrical portions to locate said bushings relative to said body portion.

3. A connection between a steering gear case and a portion of an automobile body defining an aperture comprising mutually supporting guide sleeves positioned on each side of said body portion, deformable bushings positioned in said guide sleeves and centered thereby, inner cylindrical members carried by said bushings, and bolts passed through said inner cylindrical members and attached to said steering gear case.

4. A connection between a steering gear case and a portion of an automobile body defining an aperture comprising mutually supporting guide sleeves positioned on each side of said body portion, deformable bushings positioned in said guide sleeves and centered thereby, inner cylindrical members carried by said bushings, and bolts passed through said inner cylindrical members and attached to said steering gear case, said inner cylindrical members having flanges forming bearing surfaces against said case and bolt.

5. A connection between a steering gear case and a portion of an automobile body comprising a bolt having a convex, semi-cylindrical surface on the underside of the head thereof, means forming a convex, semi-cylindrical surface on said case, said bolt extending through said body portion and said last mentioned means, and washers positioned around said bolt on each side of said body portion, said washers having concave, semi-cylindrical surfaces mating with said convex, semi-cylindrical surfaces.

6. In an automobile, a steering gear case, a rigid cross member on the body of the automobile, spaced connecting means rigid with said case and extending from said case through said rigid member at points spaced transversely along said member, spacer means around said connecting means upon the upper and lower surfaces of said rigid member and interposed between said case and said member and said member and said connecting means and including means arranged to permit said case and connecting means to tilt relative to said member, and clamping means secured to said connecting means for clamping said case to said member.

7. A connection between a steering gear case and a portion of an automobile body comprising a bolt extending through said body portion and into said case, bushings surrounding said bolt on both the upper and lower surfaces of said body portion and acting to space the head of said bolt and said case from said body portion, said bolt being rigidly attached to said gear case, and means forming a portion of said bushings permitting said case and bolt to rock relative to said body portion without disturbing the spacing function of said bushings.

8. A connection between a steering gear case and a portion of an automobile body comprising a fastener extending through said body portion and into said case and rigidly secured to said case, bushings surrounding said fastener on both surfaces of said body portion and acting to space said case from said body portion, said bushings and fastener including means movable relative to one another to permit rocking movement of said fastener and case relative to said body portion.

9. In an automotive vehicle, a frame member extending transversely of the vehicle at the front portion thereof, a steering gear case secured to the lower end of a steering column, a flat portion on a lower surface of said steering gear case extending in a plane parallel to the axis of said column, a flat portion on the upper surface of said frame member and extending in a plane parallel to the plane of said gear case flat portion and therebelow, fasteners secured to said gear case and extending therefrom through said frame member flat portion, grommets of deformable material surrounding said fasteners, said grommets being confined at both their inside and outside diameters by sleeves, means securing the inside grommet sleeves to said fasteners, and means securing the outer grommet sleeve to said frame member.

10. In a road vehicle, a frame member, a steering column assembly extending upwardly from said member and having a gear housing at its lower end, means securing the housing to the frame member, insulating grommets interposed between said housing and frame member, and ferrules confining said grommets upon their inside and outside diameters, one of said ferrules being supported from said frame member and the other of said ferrules being supported from said gear housing.

WALLACE S. BERRY.